United States Patent
Sandler et al.

(10) Patent No.: US 7,274,879 B1
(45) Date of Patent: Sep. 25, 2007

(54) COMPENSATION OF TEMPERATURE-INDUCED DISPERSION DRIFT IN OPTICAL COMMUNICATION LINKS

(75) Inventors: Howard Martin Sandler, Ottawa (CA); Maurice O'Sullivan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 735 days.

(21) Appl. No.: 10/690,659

(22) Filed: Oct. 23, 2003

(51) Int. Cl.
H04B 10/12 (2006.01)
H04B 10/00 (2006.01)

(52) U.S. Cl. ............... 398/147; 398/158; 398/159

(58) Field of Classification Search ........... 398/147, 398/148, 158, 159; 359/337.5
See application file for complete search history.

(56) References Cited

U.S. PATENT DOCUMENTS 5,815,294 A * 9/1998 Ishikawa et al. ............ 398/158
2003/0223760 A1* 12/2003 Takahara et al. ............ 398/147

OTHER PUBLICATIONS

Alexander Walter et al.: Chromatic Dispersion Variations in Ultra-Long Haul Transmission Systems Arising from Seasonal Soil Temperatrure Variations: downloaded from: http://www.wcc.nrcs.usda.gov/publications on Jul. 29, 2003 (4 pages).

Pauline Rigby: Dispersion: New Version; Apr. 29, 2002: downloaded from: http://www.lightreading.com on Jul. 29, 2003 (3 pages).

C. K. Madsen: Tunable dispersion compensators based on optical allpass filters; downloaded from: http://www.ieee.org/organizations/pubs/newsletters/loes/oct01/madsen.htm on Jul. 29, 2003 (3 pages).

* cited by examiner

Primary Examiner—M. R. Sedighian
(74) Attorney, Agent, or Firm—Jeffrey M. Measures; Borden Ladner Gervais LLP

(57) ABSTRACT

A control system for use in compensating for temperature-induced dispersion drift of an optical path, comprising an input adapted to obtain temperature data associated with the optical path; a control module adapted to determine control information on the basis of the temperature data; and an output adapted to provide a control signal to a dispersion compensator. The control signal is determined such that its receipt by the dispersion compensator causes the latter to induce a dispersive effect in a signal that travels the optical path, the dispersive effect being related to the control information. The ability to compensate for temperature-induced dispersion drift reduces the distortion margin in optical link budgets, allowing optical links to have longer reach, or to achieve the same reach using fewer line amplifiers. In a specific embodiment, dispersion compensation is accomplished via an open-loop control system such that feedback from the receiver site is not required.

45 Claims, 3 Drawing Sheets

COMPENSATION OF TEMPERATURE-INDUCED DISPERSION DRIFT IN OPTICAL COMMUNICATION LINKS

FIELD OF THE INVENTION

The present invention relates generally to optical transmission systems and, more particularly, to control systems for providing compensation of temperature-induced dispersion drift in optical communication links.

BACKGROUND OF THE INVENTION

A wavelength-division mutliplex (WDM) long haul optical network typically consists of a number of co-located transmitters (typically electrical-to-optical converters), a multiplexer to combine multiple wavelengths of light onto the same fiber, spans of buried or aerial plant fiber (each typically 40 to 120 km long), optical amplifier sites at the end of each span, a demultiplexer to separate out the wavelengths, and a set of receivers (typically optical-to-electrical converters).

One property of optical fiber which needs to be managed for high bit rate long haul optical networks is dispersion. Dispersion is the tendency for different optical wavelength components of an optical signal to propagate at different speeds, leading to distortion at the receivers. Typically, dispersion is compensated by placing a component, known as a dispersion and slope compensation module (DSCM), in some or all of the optical amplifier sites as well as multiplexer and demultiplexer sites. The DSCM has dispersion characteristics of opposite sign to the plant fiber. The net dispersion at any point is the sum of all fiber span and DSCM dispersions to that point, hence dispersion can be managed by choosing each DSCM to have the appropriate dispersion characteristics to cancel plant fiber dispersion and meet specified net dispersion targets at each optical amplifier site, as well as the receiver site.

A DSCM typically consists of a spool of optical fiber with fixed characteristics, placed in a circuit pack which goes into a shelf at an optical amplifier site. Because conventional technology is static, i.e., the dispersion of each DSCM is fixed, a problem arises when the dispersion of the optical plant fiber in the ground (or in the air) changes due to daily or seasonal temperature variations. Specifically, each type of fiber has a temperature coefficient (in ps/nm/km/° C.) which linearly relates the change in dispersion per unit path length to a change in temperature. Thus, when the temperature of a span changes, the dispersion of that span changes in proportion therewith. However, because the dispersion of each DSCM is fixed, the result is a drift of the net dispersion across each span as well as at the receiver. This problem can be referred to as temperature-induced dispersion drift.

Typically, the problem of temperature-induced dispersion drift is dealt with at the design phase by factoring a margin into the optical link budget. This forces the installation of optical amplifiers at shorter inter-amplifier distances in order to guarantee the integrity of the information being transmitted over the optical link, across an expected temperature range. Otherwise, if the optical amplifiers are kept far apart, there is an increased likelihood that the signals being received at the receiver will be distorted due to temperature-induced dispersion drift. The problem is further exacerbated as bit rates increase to 40 Gbps and beyond, and/or as link lengths increase. Thus, the need to actively compensate for temperature-induced dispersion drift in optical communication links becomes apparent.

SUMMARY OF THE INVENTION

The present invention recognizes the value of compensating for temperature-induced dispersion drift experienced by an optical signal as it travels along a span of plant fiber. Accordingly, a dispersive effect applied by a dispersion compensator is controlled as a function of temperature data associated with the span, in order to reduce the net dispersion drift affecting the optical signal. This reduces the distortion margin in optical link budgets, allowing optical links to have longer reach, or to achieve the same reach using fewer line amplifiers. In a specific embodiment, dispersion compensation is accomplished via an open-loop control system such that feedback from the receiver site is not required.

A first broad aspect of the present invention seeks to provide a control system for use in compensating for temperature-induced dispersion drift of an optical path. The control system comprises an input adapted to obtain temperature data associated with a portion of interest of the optical path. The control system also comprises a control module adapted to determine control information on the basis of the temperature data associated with the portion of interest of the optical path. Finally, the control system comprises an output adapted to provide a control signal to a dispersion compensator. The control signal is determined such that its receipt by the dispersion compensator causes the latter to induce a dispersive effect in a signal that travels the optical path, the dispersive effect being related to the control information.

In a specific embodiment, the control information is representative of a temperature change to be applied to a dispersion compensation module disposed in the optical path and which applies a dispersion drift relative to a nominal dispersion that is in accordance with the change in temperature.

In another specific embodiment, the control information is representative of a pulse shape to be applied to a digital information signal prior to being launched into the optical path; the dispersive effect is pre-distortion of the pulse shape relative to a nominal shape that would be applied in the absence of the control information.

A second broad aspect of the present invention seeks to enhance the above mentioned system with a dispersion compensator connected to the optical path and having an operating condition that is controllable via the control signal, wherein control of the operating condition causes the dispersion compensation module to induce the desired dispersive effect in the aforementioned signal that travels the optical path.

A third broad aspect of the present invention seeks to provide a method of compensating for temperature-induced dispersion drift of an optical path. The method comprises obtaining temperature data associated with a portion of interest of the optical path; determining control information on the basis of the temperature data associated with the portion of interest of the optical path; and providing a control signal to a dispersion compensator, the control signal causing the dispersion compensator to induce a dispersive effect in a signal that travels the optical path, the dispersive effect being related to the control information.

A fourth broad aspect of the present invention seeks to provide computer-readable media to control execution of the above method.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

The dispersion experienced by an optical signal as it travels along an optical path (e.g., a span of optical fiber) is a quantity that is normally expressed in units of picoseconds per nanometer (ps/nm) and which is itself a function of the wavelength, denoted $\lambda$.

Mathematically, the dispersion is the derivative of the group delay with respect to wavelength which, when plotted against wavelength, results in a curve that may be nonlinear. Moreover, it has been observed that the dispersion of an optical signal, at wavelength $\lambda$, also varies with both the temperature of the fiber (denoted $T_F$) and the length of the fiber (denoted $L_F$) through which the optical signal propagates. For the sake of notational convenience, the dispersion at wavelength $\lambda$ experienced by an optical signal that travels an optical path when the latter has a temperature $T_F$ is hereinafter denoted $D_F(\lambda; T_F)$. In practice, it has been observed that $D_F(\lambda; T_F)$ can usually be expressed as:

$$D_F(\lambda;T_F)=(d_F{}^*L_F)+(K_F{}^*L_F{}^*((T_F-T_{F,REF})), \quad \text{(eq. 1)}$$

where $T_{F,REF}$ is a "reference temperature", $(d_F{}^*L_F)$ is the "nominal dispersion" of the optical path at temperature $T_{F,REF}$ and wavelength $\lambda$, and $K_F$ is a "temperature coefficient" that represents the incremental dispersion for a particular plant fiber type in ps/nm, per unit length and unit temperature. The quantity $d_F$ is known as a dispersion coefficient per unit length. For design purposes, the reference temperature $T_{F,REF}$ may be arbitrarily selected but it may be useful to define it as the midpoint of anticipated system lifetime temperature extremes in the geographic vicinity of the portion of interest, as obtained from historical records or empirical data. By way of a simple non-limiting example in the case of aerial cable, the reference temperature $T_{F,REF}$ can be chosen as $(T_{jan}+T_{july})/2$, where $T_{jan}$ is the mean January air temperature and $T_{july}$ is the mean July air temperature.

If the temperature of the optical path changes from a temperature $T_1$ to a temperature $T_2$, there will be a resultant change in dispersion, which is referred to as a temperature-induced dispersion "drift" and is denoted $\Delta D_F(\lambda; T_1; T_2)$. Specifically, one has:

$$\Delta D_F(\lambda;T_1;T_2)=D_F(\lambda;T_2)-D_F(\lambda;T_1)$$

$$=K_F{}^*L_F{}^*((T_2-T_{F,REF})-(T_1-T_{F,REF}))$$

$$=K_F{}^*L_F{}^*(T_2-T_1). \quad \text{(eq. 2)}$$

It has been observed that, for wavelengths in the 1530 nm to 1625 nm range, the dispersion drift at a particular wavelength, relative to the nominal dispersion at that wavelength, is roughly constant from one wavelength to the next, for the same change in temperature.

Figure 1:
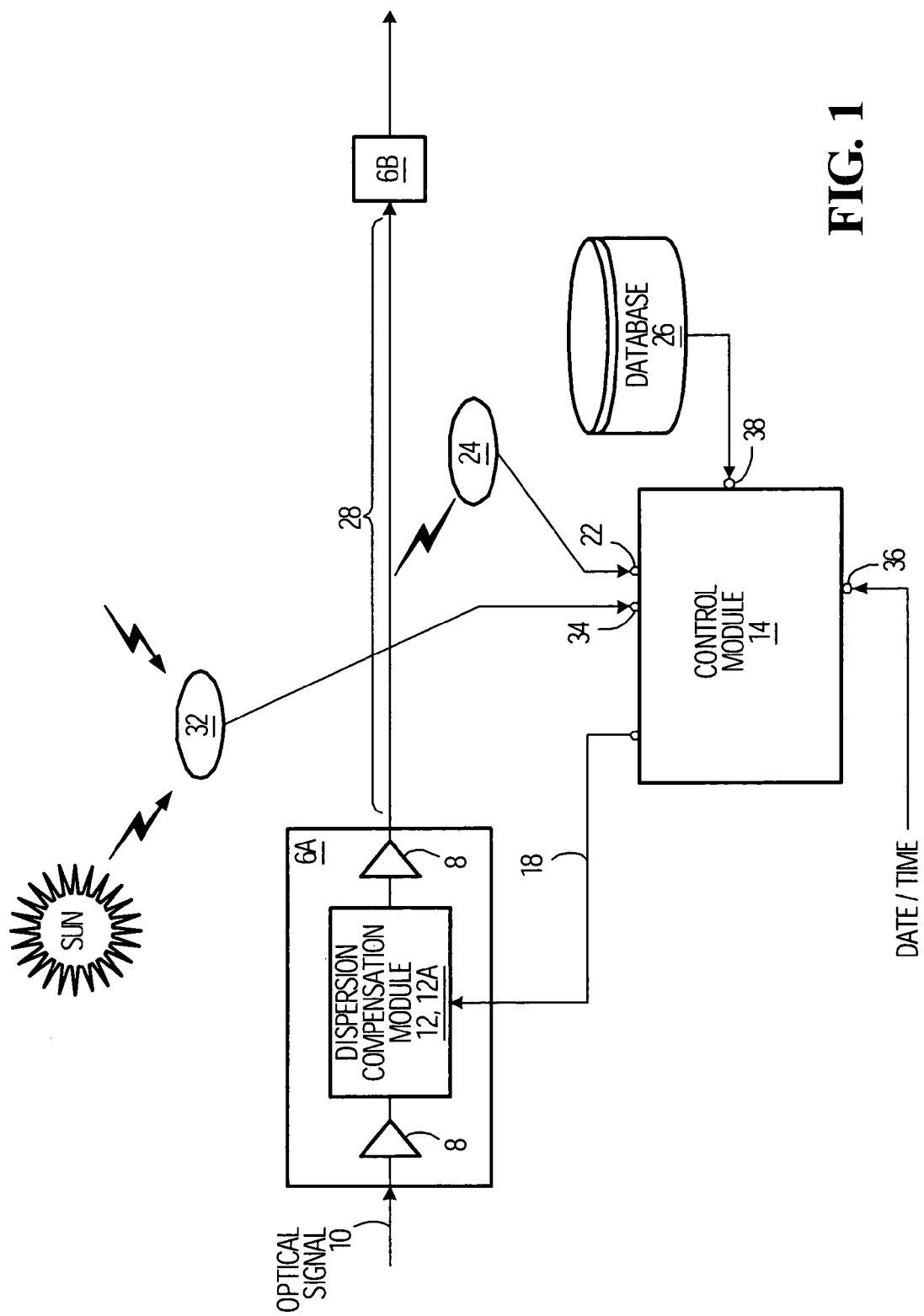
FIG. 1 is a block diagram of a dispersion compensation system in accordance with a first embodiment of the present invention.

In accordance with embodiments of the present invention, various control systems are provided that seek to compensate for the above-mentioned temperature-induced dispersion drift. With reference to FIG. 1, an in accordance with a first class of embodiments of the present invention, there is shown a dispersion compensation system for use in countering temperature-induced dispersion drift experienced by an optical signal 10 travelling along an optical path. Although a single direction of propagation is shown and described, this is for illustrative purposes only and it should be understood that bi-directional propagation and compensation is within the purview of the present invention.

The dispersion compensation system of the first class of embodiments of the present invention comprises a dispersion compensator 12 disposed in the optical path of the optical signal 10. Generally speaking, there may be more than one dispersion compensator 12 disposed in the optical path. Each dispersion compensator 12 serves to compensate for dispersion experienced by the optical signal 10 as it travels along a corresponding "portion of interest" 28 of the optical path. As shown in FIG. 1, the dispersion compensator 12 may be housed in a node 6A located upstream relative to a second node 6B. The portion of interest 28 in this case includes a section of the optical path that is downstream from the dispersion compensator 12. Alternatively, the portion of interest 28 may include a section of the optical path that is upstream from the dispersion compensator 12. In yet another variant, the dispersion compensator 12 may lie at a point between the extremities of the portion of interest 28.

The dispersion compensator 12 may be implemented as a dispersion compensation module (DCM) 12$_A$ having a controllable operating condition allowing it to controllably induce a dispersive effect in the optical signal 10 that travels the portion of interest 28 of the optical path. Specifically, the DCM 12$_A$ induces an amount of dispersion in the optical signal 10 that can be denoted by $D_{DCM}(\lambda; I_{DCM})$, where $I_{DCM}$ represents an "operating condition" of the DCM 12$_A$ that is set by a control signal 18 supplied by a control module 14. In the absence of any influence from the control signal 18, the DCM 12$_A$ is designed to operate at a nominal operating condition, denoted $I_0$, whereby the DCM 12$_A$ provides a dispersion of $D_{DCM}(\lambda; I_0)$ which at least partially compensates the nominal dispersion $(d_F{}^*L_F)$ that would be experienced by the optical signal if the portion of interest 28 were at the reference temperature $T_{F,REF}$ described previously. The at least partial compensation is designed to extend over one or more wavelengths in a desired band of wavelengths which may range from one or a few closely spaced optical carriers to an entire transmission band (e.g., C or L bands) spanning on the order of 30 nm or more, to even plural transmission bands spanning on the order of 90 nm or more (e.g., 1530 nm to 1625 nm).

Figure 2:
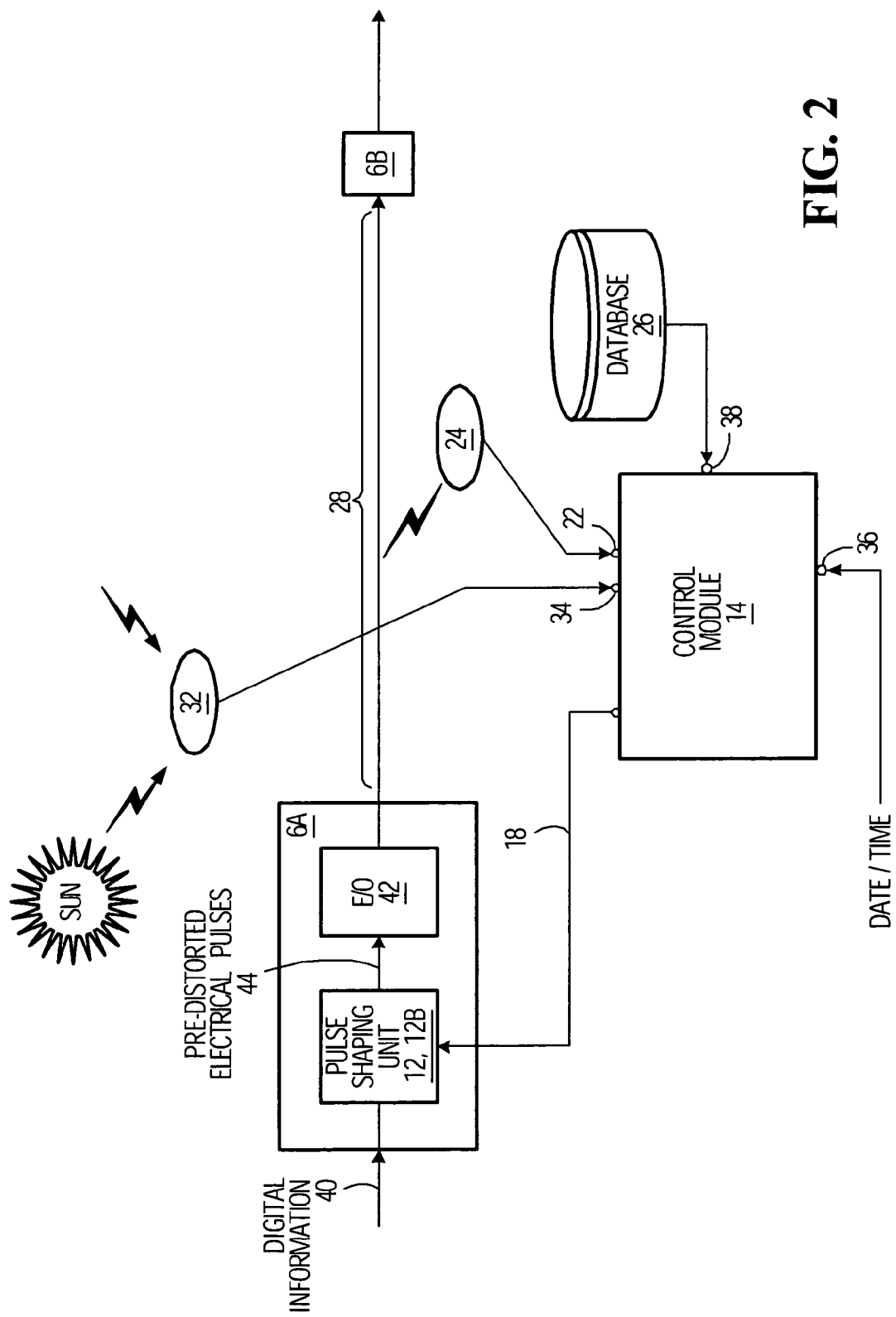
FIG. 2 is a block diagram of a dispersion compensation system in accordance with a second embodiment of the present invention.

With reference to FIG. 2, the dispersion compensation system of a second class of embodiments of the present invention comprises a dispersion compensator 12 disposed at a transmitter site 6A, prior to conversion of an electrical signal into the optical signal 10. The dispersion compensator 12 serves to pre-compensate for dispersion that will be experienced by the optical signal 10 as it travels along the portion of interest 28 of the optical path. For example, the portion of interest 28 may be the entire length of the optical path or a sub-portion thereof between the transmit site 6A containing the dispersion compensator 12 and a downstream node 6B where additional dispersion compensation may takes place.

In this second class of embodiments, the dispersion compensator 12 may be implemented as a pulse shaping unit (PSU) $12_B$ having a controllable operating condition allowing it to controllably induce a dispersive effect in the optical signal 10 that is produced by an electro-optical converter 42 from a series of electrical pulses 44. Specifically, the PSU $12_B$ takes digital information signal 40 and applies a distorted pulse shape thereto. In general, the electro-optical converter 42 would take the form of a complex modulator, able to produce both a controllable phase and amplitude of the resulting optical waveform. An example of such a modulator is described in co-pending U.S. patent application Ser. No. 10/262,944, filed on Oct. 3, 2002 and incorporated by reference herein. The resulting pulses 44 have a shape differing from a standard optical pulses in that, when the pulses 44 are converted to the optical signal 10 by the electro-optic converter 42 and launched into the optical path, and when the optical signal 10 undergoes dispersion due to travel along the optical path, the pulse shape will return to a shape that is closer to that of a standard optical pulse. In other words, by creating pre-distorted electrical pulses, the pulse shape of the remotely received optical signal appears to have undergone less dispersion than it actually did.

The pulse shape applied by the PSU $12_B$ is set by a control signal 18 supplied by a control module 14. In the absence of any influence from the control signal 18, the PSU $12_B$ is designed to produce pulses that are already pre-distorted to a certain extent so as to at least partially compensate for the nominal dispersion ($d_F*L_F$) that would be experienced by the optical signal if the portion of interest 28 were at the reference temperature $T_{F,REF}$ described previously. In this case, the at least partial compensation need only apply to the wavelength of the signal produced by the electro-optic converter 44 associated with that signal. A separate electro-optical converter is provided for each signal being multiplexed onto the transmission fiber.

Figure 3:
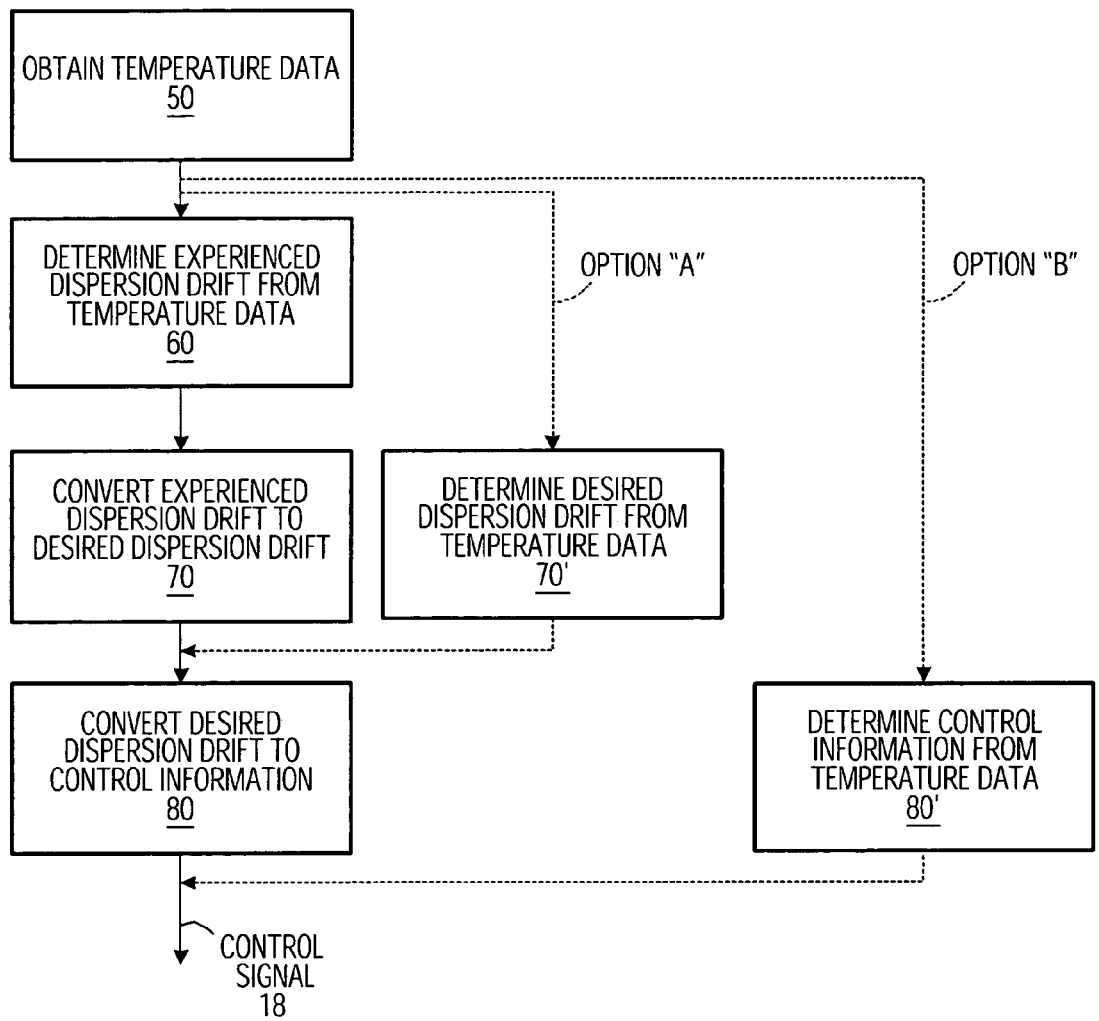
FIG. 3 is a flowchart illustrating various steps executed by a control module in the dispersion compensation systems of FIGS. 1 and 2.

Generally speaking, for either class of embodiment, the control module 14 is designed in such a way that the resulting control signal 18 will contain control information that causes the dispersion compensator 12 (i.e., wither DCM $12_A$ or PSU $12_B$) to induce a change in the dispersive effect in the optical signal 10 that compensates, at least partially, for the dispersion drift induced by changes in the temperature of the portion of interest 28 relative to the reference temperature $T_{F,REF}$. The control module 14 is designed to compute the control information for the dispersion compensator 12 in accordance with a series of steps that are now generally described with reference to FIG. 3.

At step 50, the control module 14 begins by obtaining temperature data associated with the portion of interest 28. The temperature data associated with the portion of interest 28 may be obtained experimentally and/or derived analytically. For instance, in one embodiment, the temperature data associated with the portion of interest 28 is representative of a current temperature in a vicinity of the portion of interest 28. In another embodiment, the temperature data associated with the portion of interest 28 is representative of a current temperature in a vicinity of a portion of the optical path other than the portion of interest 28, e.g., further upstream or downstream. A thermometer 24, located, e.g., underground or in the air, may be used to measure the current temperature, denoted $T_{F,CUR}$, and to provide the measured temperature to the control module 14 via an input 22.

In the case where the portion of interest 28 is airborne and is affected by a solar heating factor that is a function of level of sunlight, data regarding a current level of sunlight in the vicinity of the portion of interest 28 may be measured by a photosensitive element 32. The photosensitive element 32 provides the data regarding the current level of sunlight to the control module 14 via an input 34. Thus, the current temperature $T_{F,CUR}$ of the portion of interest 28 may be estimated on the basis of the solar heating factor at the current measured level of sunlight and the current measured temperature.

At step 60, the control module 14 converts the temperature data obtained at step 50 into an "experienced dispersion drift". In one implementation, the control module 14 achieves this by first computing a current temperature "drift", denoted $\Delta T_F$. The current temperature drift $\Delta T_F$ may be defined as the difference of the current temperature $T_{F,CUR}$ relative to the reference temperature $T_{F,REF}$ or the previous instance at which the temperature data was obtained. For simplicity, it will hereinafter be assumed that the current temperature drift $\Delta T_F$ is computed relative to the reference temperature $T_{F,REF}$, i.e., $\Delta T_F = T_{F,CUR} - T_{F,REF}$. However, it is within the scope of the present invention to compute the current temperature drift $\Delta T_F$ relative to the previous instance at which the temperature data was obtained, in which case $\Delta T_F = T_{F,CUR} - T_{F,CUR-1}$, where $T_{F,CUR-1}$ denotes the previous version of $T_{F,CUR}$. In particular, in one embodiment, the previous instance at which the temperature data was obtained is at the time the system is initially set up and dispersion compensators trimmed or selected to provide a desired net dispersion at the receiver.

In a variant, rather than process any actual temperature measurements, the control module 14 estimates the current temperature drift $\Delta T_F$ on the basis of historio-geographic temperature fluctuation data associated with the portion of interest 28. This may consist of records of hourly, daily, weekly and/or monthly temperature variations of air, soil and/or water in the vicinity of the portion of interest 28. In addition, data regarding a current calendar date and/or time is provided to the control module via an input 36. This data may be obtained from a locally or remotely generated system clock (not shown), for example.

The current temperature drift $\Delta T_F$ is based on the current calendar date and/or time and the historio-geographic temperature fluctuation data, accounting for the phase delay with which the external temperature affects the internal temperature of the plant fiber that makes up the portion of interest 28. The following example computation for buried cable is for illustrative purposes only and is not to be considered as a limitation of the present invention:

$$\Delta T_F = 0.7 * \tfrac{1}{2}(T_{jul} - T_{jan}) * \sin(2\pi(\text{day\_of\_year} - 131)/365),$$

where January 1 corresponds to day_of_year=1, January 2 corresponds to day_of_year=2, and so on. To account for solar heating without requiring that further input be provided to the control module 14, a fixed or time-dependent offset can be added to $\Delta T_F$.

Regardless of how $\Delta T_F$ is obtained, the control module 14 then converts this quantity to a dispersion drift that is being experienced by the optical signal as it travels along the portion of interest 28. This is referred to as the "experienced" dispersion drift of the portion of interest 28 and is derivable from (eq. 2) above, where it is recalled that $\Delta D_F(\lambda; T_1; T_2) = K_F * L_F * (T_2 - T_1)$. Under the assumption made above, $T_2$ is equal to $T_{F,CUR}$ and $T_1$ is equal to $T_{F,REF}$. Thus, $\Delta D_F(\lambda; T_{F,REF}; T_{F,CUR})$ represents the change in the dispersion, at wavelength $\lambda$, resulting from a change in temperature of the portion of interest 28 with respect to the reference temperature $T_{F,REF}$ and this may be expressed as follows:

$$\Delta D_F(\lambda; T_{F,REF}; T_{F,CUR}) = K_F * L_F * \Delta T_F. \quad \text{(eq. 3)}$$

Of course, if the current temperature drift $\Delta T_F$ were computed relative to the previous instance at which temperature data was obtained for the portion of interest 28, then the experienced dispersion drift would be represented as $\Delta D_F(\lambda; T_{F,CUR-1}; T_{F,CUR})$, and would symbolize the change in the dispersion, at wavelength $\lambda$, resulting from a change in temperature of the portion of interest 28 with respect to the previous value of $T_{F,CUR}$.

At step 70, the control module 14 determines a "desired" dispersion drift on the basis of the expected dispersion drift from step 60. The desired dispersion drift, hereinafter denoted $Z(\lambda)$, is the drift relative to the dispersion $D_{DCM}(\lambda; I_0)$ which would have been applied in the absence of the control signal 18. Specifically, the desired dispersion drift $Z(\lambda)$ is computed on the basis of the experienced dispersion drift (which is $\Delta D_F(\lambda; T_{F,REF}; T_{F,CUR})$ or $\Delta D_F(\lambda; T_{CUR-1}; T_{F,CUR})$). In one embodiment, the desired dispersion drift $Z(\lambda)$ at each wavelength $\lambda$ in the band should ideally be set to the opposite of the experienced dispersion drift $\Delta D_F(\lambda; T_{F,REF}; T_{F,CUR})$ at that same wavelength. This would achieve perfect cancellation over the entire band of wavelengths. However, it should be expressly noted that perfect cancellation is not necessary at any or all wavelengths, and it may be acceptable to achieve only partial compensation over less than all wavelengths in the desired band of wavelengths.

At step 80, the control module 14 now converts the desired dispersion drift $Z(\lambda)$ into "control information", which is encoded into the control signal and used to vary the operating condition of the dispersion compensator 12. The manner of controlling the dispersion compensator 12 so that it induces the desired dispersion drift $Z(\lambda)$ will of course depend on the nature of the dispersion compensator 12. This can be done in numerous ways, two of which are described below in respect of the first and second classes of embodiments.

For example, in one option applicable to the first class of embodiments wherein the dispersion compensator 12 is embodied as DCM 12$_A$, the DCM 12$_A$ may comprise a spool of dispersion-compensating fiber housed in a controlled-temperature unit equipped with, for example, a heating coil or Pelletier effect heating/cooling element in an oven. The dispersion compensating fiber is characterized by its own respective temperature coefficient $K_{DCM}$ that represents the incremental dispersion for the dispersion compensating fiber in ps/nm, per unit length and unit temperature. Thus, $I_{DCM}$, which represents the operating condition of the DCM 12$_A$, can be represented by a temperature, denoted $T_{DCM}$. Generally speaking, the dispersion induced by the dispersion-compensating fiber can typically be expressed by:

$$D_{DCM}(\lambda; I_{DCM}) = (d_{DCM} * L_{DCM}) + (K_{DCM} * L_{DCM} * ((T_{DCM} - T_{DCM,REF}))), \quad \text{(eq. 4)}$$

where $(d_{DCM} * L_{DCM})$ is the dispersion of the dispersion compensating fiber at a given reference temperature $T_{DCM,REF}$ and at a given length $L_{DCM}$. The quantity $d_{DCM}$ is known as a dispersion coefficient per unit length. As a design parameter, by setting $T_{DCM}$ equal to some convenient initial value $T_0$, one can compute $L_{DCM}$ such that, at the temperature of $T_0$, the dispersion induced by the dispersion-compensating fiber will equal the negative of the nominal dispersion $(d_F * L_F)$ in the portion of interest 28. This is of course not a requirement or limitation of the present invention.

Now, one can cause the current temperature of the dispersion compensator 12, denoted $T_{DCM,CUR}$, to change over time in order to compensate for the temperature-induced changes in the portion of interest. The operating condition can thus be expressed as $I_{DCM} = T_{DCM,CUR}$. Specifically, the dispersion drift from $-(d_F * L_F)$ that will result from keeping the dispersion-compensating fiber at a temperature of $T_{DCM,CUR}$ instead of $T_0$ is computed from (eq. 4) above as follows:

$$\Delta D_{DCM}(\lambda; T_{DCM,CUR}) = K_{DCM} * L_{DCM} * ((T_{DCM,CUR} - T_{DCM,REF}) - (T_0 - T_{DCM,REF}))$$

$$= K_{DCM} * L_{DCM} * (T_{DCM,CUR} - T_0). \quad \text{(eq. 5)}$$

Now, setting the above to equal the desired dispersion drift $Z(\lambda)$, one has:

$$\Delta D_{DCM}(\lambda; T_{DCM,CUR}) = -\Delta D_F(\lambda; T_{F,REF}; T_{F,CUR})$$

$$K_{DCM} * L_{DCM} * (T_{DCM,CUR} - T_0) = -K_F * L_F * \Delta T_F$$

$$(T_{DCM,CUR} - T_0) = -K_F * L_F * \Delta T_F / (K_{DCM} * L_{DCM}). \quad \text{(eq. 6)}$$

In this case, $(T_{DCM,CUR} - T_0)$ represents the control information. Specifically, $(T_{DCM,CUR} - T_0)$ corresponds to a desired temperature drift of the dispersion-compensating fiber with respect to the initial temperature $T_0$. Consequently, when the desired temperature drift is applied by the controlled-temperature unit, the dispersion compensator 12 will be caused to induce a drift in the dispersion of the dispersion compensating fiber that corresponds to the negative of $Z(\lambda)$, thereby compensating at least partially for the dispersion drift experienced by the optical signal as it travels along the portion of interest 28, due to the temperature of the portion of interest 28 being at $T_{F,CUR}$ instead of $T_{F,REF}$.

Now, it is recalled that the nominal dispersion of the portion of interest 28 at the reference temperature $T_{F,REF}$ is $(d_F * L_F)$ and the dispersion of the dispersion compensating fiber at the reference temperature $T_{DCM,REF}$ is $(d_{DCM} * L_{DCM})$. Thus, if one of these two quantities is designed to equal the negative of the other, then one obtains $L_F/L_{DCM} = -d_{DCM}/d_F$. Substituting this into (eq. 6), one obtains:

$$(T_{DCM,CUR} - T_0) = \Delta T_F * (K_F * d_{DCM})/(K_{DCM} * d_F).$$

Thus, the quantity $(T_{DCM,CUR} - T_0)$ is seen to depend linearly with the current temperature drift $\Delta T_F$ of the portion of interest, and the control module 14 need not be supplied with any length information. Hence, as the temperature of the portion of interest 28 changes, the temperature of the dispersion-compensating fiber changes in linear accordance therewith.

Of course, rather than encode the control information as the change in temperature $(T_{DCM,CUR} - T_0)$, it is within the scope of the present invention to encode the control information as the target temperature $T_{DCM,CUR}$ itself. In either case, control of the temperature of the dispersion-compensating fiber is achieved, which translates into control (e.g., reduction or minimization) of the net dispersion drift being experienced by the optical signal.

In an alternative embodiment, one can keep the temperature of the dispersion-compensating fiber stable but permit the length of the dispersion-compensating fiber to change over time in order to compensate for the temperature-induced changes in the portion of interest. In this case, the control information is expressed as a desired change in length of the dispersion-compensating fiber. Consequently, when the desired change in length is applied by the controlled-temperature unit, the dispersion compensator 12 will be caused to induce a drift in the dispersion of the dispersion compensating fiber that corresponds to the negative of $Z(\lambda)$, thereby compensating at least partially for the dispersion drift experienced by the optical signal as it travels along the portion of interest 28, due to the difference in temperature of the portion of interest 28 between $T_{F,CUR}$ and $T_{F,REF}$.

In order to provide the requisite variability in path length through the dispersion compensation module $12_A$, there could be provided an arrangement of dispersion-compensating fiber segments that are interconnected via a controllable switching matrix and are kept at a stable temperature. The dispersion-compensating fiber segments may be characterized by the same or different temperature coefficients. The switching matrix, which may be formed out of micro-electro-mechanical switches (MEMS), allows control of the interconnection between dispersion-compensating fiber segments, which allows control of the path length through the dispersion compensator 12. Based on the above equations, the control module 14 computes control information in the form of a change in path length. The desired change in path length through the dispersion-compensating fiber segments is encoded into a control signal (e.g., in the form of switching instructions) which is fed to the switching matrix.

Still other variants of the first class of embodiments are envisaged. For example, the dispersion compensation module $12_A$ may be implemented as an etalon characterized by a resonant frequency. The resonant frequency changes the path length through the etalon, which changes the dispersion experienced by an optical signal passing therethrough. The change in the dispersion with resonant frequency behaves in accordance with a known dispersion function (either analytically or experimentally determined). Control of the resonant frequency is achieved through manipulation of an electrostatically-actuated membrane. Thus, based on the dispersion function of the etalon and the desired dispersion drift $Z(\lambda)$, the control module 14 can readily be designed to compute a resonant frequency which will cause the dispersion compensation module $12_A$ to induce an amount of dispersion that at least partly cancels the dispersion drift experienced by the optical signal as it travels through the portion of interest 28. In this case, the control information is the resonant frequency and the control signal is generated accordingly, so that when the control signal is applied to the membrane, the etalon will exhibit the desired resonant frequency.

It is recalled that in accordance with a second class of embodiments of the present invention, the dispersion compensator 12 is embodied as PSU $12_B$ that takes the digital information signal 40 and produces pre-distorted electrical pulses 44 therefrom. The pulse shape of the pre-distorted electrical pulses 44 is set by the control signal 18. In performing step 80, the control module 14 determines the appropriate pulse shape of the pre-distorted electrical pulses on the basis of the desired dispersion drift. This can be achieved by mapping the desired dispersion drift to a pulse shape. The mapping may be defined by an analytical computation or a lookup table that is populated with the results of an analytical computation, a simulation or empirical test results. In the result, the control information contained in the control signal 18 is representative of a desired pulse shape.

In a variant, the mapping may be defined by a table that converts the desired dispersion drift $Z(\lambda)$ into a code that is selected from a group of codes representing various pulse shapes. The PSU $12_B$ is assumed to understand the meaning of the various codes and, more particularly, the pulse shape that needs to be generated in accordance with each code.

In another variant, the control signal 18 may contain merely the desired dispersion drift $Z(\lambda)$ which is supplied to the PSU $12_B$. The PSU $12_B$ is responsible for performing the mapping and hence it will be apparent that the execution of step 18 will be executed partly by the control module 14 and partly by the PSU $12_B$. As this alternative implementation suggests, the control module 14 may be distributed throughout more than one physical entity, including the PSU $12_B$.

The above description has described steps 50, 60, 70 and 80 as they would be performed in sequence by the control module 14 of FIGS. 1 and 2. However, those skilled in the art will appreciate that in some embodiments of the invention, the execution of both step 60 and both 70 is not a requirement. In fact, (see option "A" in FIG. 3), the control module 14 may simply execute step 70' by virtue of which the current temperature drift $\Delta T_F$ computed at step 50 is directly converted to the desired dispersion drift $Z(\lambda)$. One way of achieving this result is to maintain a database 26 with a set of entries corresponding to predetermined potential values of the desired dispersion drift $Z(\lambda)$ for the dispersion compensator 12. The entries in the database 26 are indexed in accordance with potential values of the current temperature drift of the portion of interest 28. The database 26 is connected to the control module 14 via an input 38. Given the current temperature drift $\Delta T_F$ of the portion of interest 28, the control module 14 determines the desired dispersion drift $Z(\lambda)$ for the dispersion compensator 12 by looking up the value of an entry in the database 26 that is selected as a function of $\Delta T_F$.

Those skilled in the art will also appreciate that in yet another embodiment, it will not be necessary for the control module 14 to perform any of steps 60, 70 or 80. In fact, (see option "B" in FIG. 3), the control module 14 may simply execute step 80' by virtue of which the current temperature drift $\Delta T_F$ computed at step 50 is directly converted to the control information. One way of achieving this result is to populate the database 26 with a set of entries corresponding to predetermined potential values of the control information for the dispersion compensator 12. The entries in the database 26 are indexed in accordance with potential values of the control information. Thus, given the current temperature drift $\Delta T_F$ of the portion of interest 28, the control module 14 determines the control information for the dispersion compensator 12 by looking up the value of an entry in the database 26 that is selected as a function of $\Delta T_F$.

Additionally, it will be appreciated by those of ordinary skill in the art that the control module 14 described herein above does not need to condition its operation on the accuracy with which the dispersion compensator 12 is able to cancel the dispersion drift experienced by the optical signal; thus, the control module 14 is said to provide "open-loop" or "feedforward" dispersion compensation.

It should also be appreciated that the control module 14 may be embodied as an arithmetic and logic unit (ALU) having access to a code memory (not shown) or other computer readable storage medium which stores program instructions for the operation of the ALU. In other embodiments, the control module 14 may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

We claim:

1. A control system for use in compensating for temperature-induced dispersion drift of an optical path, the control system comprising:
   a) an input adapted to obtain temperature data associated with a portion of interest of the optical path;
   b) a control module adapted to determine control information on the basis of the temperature data associated with the portion of interest of the optical path;
   c) an output adapted to provide a control signal to a dispersion compensator, the control signal causing the dispersion compensator to induce a dispersive effect in a signal that travels the optical path, the dispersive effect being related to the control information;
   wherein the control information is representative of a pulse shape to be applied to a digital information signal prior to being launched into the optical path.

2. The control system defined in claim 1, wherein the control module being further adapted to:
   determine a desired dispersion drift on the basis of the temperature data associated with the portion of interest of the optical path;
   determining the control information on the basis of the desired dispersion drift.

3. The control system defined in claim 2, wherein the control information is representative of a temperature change to be applied to a dispersion compensation module disposed in the optical path.

4. The control system defined in claim 3, wherein the dispersive effect is a temperature-induced change in dispersion of the dispersion compensation module relative to a nominal dispersion of the dispersion compensation module in the absence of the control information.

5. The control system defined in claim 4, wherein the dispersive effect is pre-distortion of the pulse shape relative to a nominal shape in the absence of the control information.

6. The control system defined in claim 2, wherein the control module being further adapted to:
   determine a current temperature drift of the portion of interest of the optical path on the basis of the temperature data associated with the portion of interest of the optical path, the current temperature drift representing an offset from a reference temperature associated with the portion of interest of the optical path;
   determine the desired dispersion drift on the basis of the current temperature drift of the portion of interest of the optical path.

7. The control system defined in claim 6, wherein the desired dispersion drift represents an offset from a reference dispersion, wherein the reference dispersion is related to the reference temperature by the reference dispersion being at least partly compensatory with respect to the dispersion that would be experienced by the signal as a result of traveling along the portion of interest if the portion of interest were at the reference temperature.

8. The system defined in claim 7, wherein the reference temperature is selected to be in a range bounded by anticipated system lifetime temperature extremes.

9. The control system defined in claim 6, wherein the temperature data associated with the portion of interest of the optical path is representative of a current temperature in a vicinity of the portion of interest of the optical path.

10. The control system defined in claim 9, further comprising:
    d) a thermometer for measuring the current temperature in the vicinity of the portion of interest of the optical path.

11. The control system defined in claim 9,
    wherein the control module being further adapted to determine a difference between (i) the current temperature in the vicinity of the portion of interest of the optical path and (ii) the reference temperature.

12. The control system defined in claim 9,
    wherein the input is further adapted to obtain:
    data regarding a current level of sunlight in the vicinity of the portion of interest of the optical path;
    data regarding a solar heating factor as a function of level of sunlight;
    wherein the control module being adapted to:
    determine an estimated current temperature of the portion of interest of the optical path on the basis of the current temperature in the vicinity of the portion of interest of the optical path and the solar heating factor at the current level of sunlight in the vicinity of the portion of interest of the optical path;
    determine the difference between (i) the estimated current temperature of the portion of interest of the optical path and (ii) the reference temperature.

13. The control system defined in claim 6, wherein the temperature data associated with the portion of interest of the optical path is representative of a current temperature in a vicinity of a portion of the optical path other than the portion of interest of the optical path.

14. The control system defined in claim 6, wherein the temperature data associated with the portion of interest of the optical path comprises historio-geographic temperature fluctuation data.

15. The control system defined in claim 14,
    wherein the input is further adapted to obtain data regarding a current calendar date;
    wherein the control module being further adapted to:
    determine an estimated current temperature of the portion of interest of the optical path on the basis of the current calendar date and the historio-geographic temperature fluctuation data; and
    determine a difference between (i) the estimated current temperature of the portion of interest of the optical path and (ii) the reference temperature.

16. The control system defined in claim 14,
    wherein the input is further adapted to obtain:
    data regarding a current calendar date;
    data regarding a current time of day; and
    data regarding a solar heating factor as a function of time of day;
    wherein the control module being further adapted to:
    determine an estimated current temperature of the portion of interest of the optical path on the basis of the current calendar date, the solar heating factor at the current time of day and the historio-geographic temperature fluctuation data; and
    determine a difference between (i) the estimated current temperature of the portion of interest of the optical path and (ii) the reference temperature.

17. The control system defined in claim 6, further comprising a database having a plurality of entries corresponding to potential values of the desired dispersion drift, the plurality of entries being indexed in accordance with potential values of the current temperature drift of the portion of interest of the optical path.

18. The control system defined in claim 17, wherein the control module being further adapted to obtain, from the database, the value of an entry selected as a function of the current temperature drift of the portion of interest of the optical path.

19. The control system defined in claim 6,
wherein the portion of interest of the optical path is characterized by a dispersion coefficient representative of incremental dispersion per unit temperature; and
wherein the control module being adapted to determine the desired dispersion drift comprises the control module being adapted to:
determine an experienced dispersion drift associated with the portion of interest of the optical path on the basis of the current temperature drift of the portion of interest of the optical path and the dispersion coefficient;
convert the experienced dispersion drift associated with the portion of interest of the optical path into the desired dispersion drift.

20. The control system defined in claim 19, wherein the control module being further adapted to compute the experienced dispersion drift as a linear function of the current temperature drift of the portion of interest of the optical path.

21. The control system defined in claim 20, wherein the control module being further adapted to set the desired dispersion drift to be the opposite of the experienced dispersion drift associated with the portion of interest of the optical path.

22. The control system defined in claim 1, further comprising a database having a plurality of entries corresponding to potential values of the control information, the plurality of entries being indexed in accordance with potential values of the temperature data associated with the portion of interest of the optical path.

23. The control system defined in claim 22, wherein the control module being adapted to determine control information on the basis of the temperature data associated with the portion of interest of the optical path comprises the control module to obtain, from the database, the value of an entry selected as a function of the temperature data associated with the portion of interest of the optical path.

24. The control system defined in claim 23, wherein the temperature data associated with the portion of interest of the optical path is representative of a current temperature in a vicinity of the portion of interest of the optical path.

25. A system for use in compensating for temperature-induced dispersion drift of an optical path, the system comprising:
a) a dispersion compensator connected to the optical path and having an operating condition that is controllable via a control signal, wherein control of the operating condition causes the dispersion compensation module to induce a dispersive effect in a signal that travels the optical path;
b) a control module adapted to:
obtain temperature data associated with a portion of interest of the optical path;
determine control information on the basis of the temperature data associated with the portion of interest of the optical path;
generate the control signal on the basis of the control information, the control signal providing control of the operating condition of the dispersion compensation module;
wherein the control information is representative of a pulse shape to be applied to a digital information signal prior to being launched into the optical path.

26. The system defined in claim 25, wherein the dispersion compensator is a dispersion compensation module.

27. The system defined in claim 26, wherein the dispersion compensation module is placed upstream from the portion of interest of the optical path.

28. The system defined in claim 26, wherein the dispersion compensation module is placed downstream from the portion of interest of the optical path.

29. The system defined in claim 26, wherein the dispersion induced by the dispersion compensation module spans a band of optical wavelengths.

30. The system defined in claim 29, wherein the band of optical wavelengths spans at least 30 nanometers.

31. The system defined in claim 29, wherein the band of optical wavelengths spans at least 90 nanometers.

32. The system defined in claim 26,
wherein the operating condition of the dispersion compensation module is a temperature of the dispersion compensation module;
wherein the control information is desired temperature information for the dispersion compensation module;
wherein the control module being further adapted to determine the desired temperature information for the dispersion compensation module on the basis of the temperature data associated with the portion of interest of the optical path.

33. The system defined in claim 26,
wherein the operating condition of the dispersion compensation module is a temperature of the dispersion compensation module;
wherein the control information is desired temperature information for the dispersion compensation module;
wherein the portion of interest of the optical path is characterized by a first dispersion coefficient representative of incremental dispersion per unit temperature induced by the portion of interest of the optical path;
wherein the dispersion compensation module is characterized by a second dispersion coefficient representative of incremental dispersion per unit temperature induced by the dispersion compensation module;
wherein the control module being further adapted to determine the desired temperature information for the dispersion compensation module on the basis of (i) the temperature data associated with the portion of interest of the optical path; (ii) the first dispersion coefficient; and (iii) the second dispersion coefficient.

34. The system defined in claim 33,
wherein the temperature data associated with the portion of interest of the optical path is the difference between a current temperature of the portion of interest of the optical path and a first reference temperature;
wherein the control module being further adapted to determine a desired temperature offset from a second reference temperature as a linear function of the temperature data associated with the portion of interest of the optical path.

35. The control system defined in claim 34, wherein the first reference temperature is related to the second reference temperature by the second reference temperature causing a dispersion-compensating fiber to induce an amount of dispersion that provides at least partial compensation of the dispersion that would be experienced by the signal as a result of traveling along the portion of interest if the portion of interest were at the first reference temperature.

36. The system defined in claim 35, wherein the dispersion compensation module comprises:

a spool of dispersion-compensating fiber inserted into the optical path;

a controlled-temperature environment housing the spool of dispersion compensating fiber and adapted to change the temperature of the spool of dispersion-compensating fiber in accordance with the control signal, thereby to apply the desired temperature offset from the second reference temperature.

37. The system defined in claim 26, wherein the dispersion compensation module comprises an etalon characterized by a resonant frequency;

wherein the operating condition of the dispersion compensation module is the resonant frequency of the etalon;

wherein the control information is desired resonant frequency information for the etalon;

wherein the control module being further adapted to determine the desired resonant frequency information for the dispersion compensation module on the basis of the temperature data associated with the portion of interest of the optical path.

38. The system defined in claim 25, further comprising:

c) a database comprising a plurality of entries containing potential values of the control information, the database entries being indexed in accordance with potential values of the temperature data associated with the portion of interest of the optical path.

39. The system defined in claim 38, wherein the control module being adapted to determine control information comprises the control module being adapted to extract from the database the contents of the entry indexed by the temperature data associated with the portion of interest of the optical path.

40. The system defined in claim 25, wherein the dispersion compensator is a pulse shaping unit.

41. The system defined in claim 40, wherein the operating condition of the pulse shaping unit is the pulse shape applied to the digital information signal;

wherein the control information is a desired pulse shape for the pulse shaping unit;

wherein the control module being further adapted to determine the desired pulse shape for the pulse shaping unit on the basis of the temperature data associated with the portion of interest of the optical path.

42. The system defined in claim 41, further comprising:

a database comprising a plurality of entries indicative of potential pulse shapes for the pulse shaping unit, the database entries being indexed in accordance with values of temperature data;

wherein the control module being further adapted to access the database entry indexed in accordance with the temperature data associated with the portion of interest of the optical path.

43. The system defined in claim 41, further comprising:

wherein the control module being further adapted to analytically compute the desired pulse shape on the basis of the temperature data associated with the portion of interest of the optical path.

44. A method of compensating for temperature-induced dispersion drift of an optical path, comprising:

obtaining temperature data associated with a portion of interest of the optical path;

determining control information on the basis of the temperature data associated with the portion of interest of the optical path;

providing a control signal to a dispersion compensator, the control signal causing the dispersion compensator to induce a dispersive effect in a signal that travels the optical path, the dispersive effect being related to the control information;

wherein the control information is representative of a pulse shape to be applied to a digital information signal prior to being launched into the optical path.

45. Computer-readable media tangibly embodying a program of instructions executable by a computer to perform a method of compensating for temperature-induced dispersion drift of an optical path, the method comprising:

obtaining temperature data associated with a portion of interest of the optical path;

determining control information on the basis of the temperature data associated with the portion of interest of the optical path;

providing a control signal to a dispersion compensator, the control signal causing the dispersion compensator to induce a dispersive effect in a signal that travels the optical path, the dispersive effect being related to the control information;

wherein the control information is representative of a pulse shape to be applied to a digital information signal prior to being launched into the optical path.

* * * * *